No. 820,256. PATENTED MAY 8, 1906.
J. T. REESE.
GATE.
APPLICATION FILED JAN. 4, 1906.
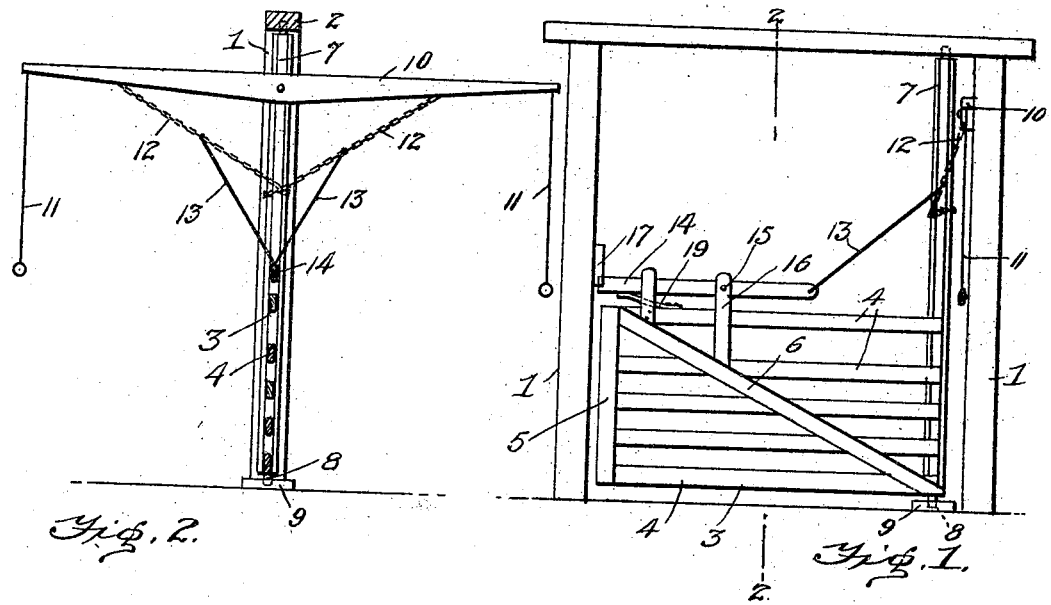
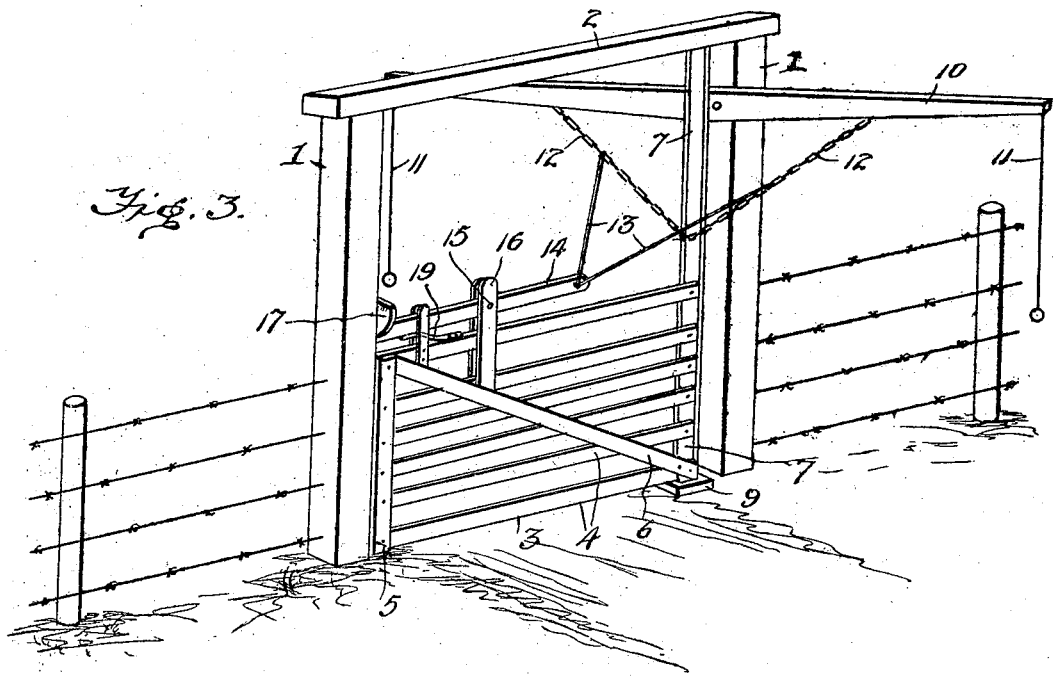
Witnesses
Inventor
J. T. Reese.
by H. B. Wilson
Attorney.

UNITED STATES PATENT OFFICE.

JAMES T. REESE, OF ROANE, TEXAS.

GATE.

No. 820,256.  Specification of Letters Patent.  Patented May 8, 1906.

Application filed January 4, 1906. Serial No. 294,609.

*To all whom it may concern:*

Be it known that I, JAMES T. REESE, a citizen of the United States, residing at Roane, in the county of Navarro and State of Texas, have invented certain new and useful Improvements in Gates; and I do declare the following to be a full, clear, and exact description of the invention, such as will enable others skilled in the art to which it appertains to make and use the same.

This invention relates to gates; and one of the principal objects of the same is to provide means whereby the gate may be opened and swung in a direction away from the operator at either side of the gate.

Another object is to provide simple, reliable, and efficient means for latching the gate after each operation of the same.

These and other objects are attained by means of the construction illustrated in the accompanying drawings, in which—

Figure 1 is a front elevation of the gate closed. Fig. 2 is a vertical section on the line 2 2, Fig. 1, and Fig. 3 is a perspective view of the gate in closed position.

Referring to the drawings for a more particular description of my invention, the numeral 1 designates the uprights of the gate-frame, and 2 is a cross-bar at the top of the same. The gate 3, which is provided with longitudinal bars 4, an end bar 5, and a diagonal bar 6, is secured to a pivoted stile 7, the lower end of which is provided with a pintle 8, pivoted in a plate 9, properly secured in position next to one of the uprights 1 of the gate-frame. The stile 7 at its upper end is provided with a suitable pintle having a bearing in the cross-bar 2, said stile 7 being free to turn in its bearings in either direction.

Pivoted centrally upon the upright 1 is a gate-operating bar 10, said bar having operating-cords 11 secured to its ends. Chains 12 are secured upon opposite sides of the gate to the bar 10, and the opposite ends of said chains are passed around the stile 7 and secured thereto by staples or other suitable means. Connected to each of the chains 12 is a cord or other suitable flexible connection 13, said cords extending to a latch-bar 14, said latch-bar being pivoted at 15 between uprights 16 on the gate, and the free end of said latch-bar adapted to ride under a catch 17, secured to one of the uprights 1 and having curved ends to permit the latch-bar to ride under said catch as the gate swings into closed position. A spring 19 is secured to the gate and bears at its free end under the latch-bar 14 to hold the latch in engagement with the catch 17. This spring, however, may be dispensed with when the bar 14 is properly balanced upon the pivotal pin 15.

The operation of my gate will be understood from the foregoing description. By pulling down upon one of the cords 11 the latch-bar 14 will be raised by means of the cord 13, and the opposite end of the latch will be depressed and moved out of the notch in the catch 17, and a further downward movement of the cord 11 will swing the gate outward away from the operator. When the person has passed through the gate, by pulling downward upon the other cord 11 the gate will be closed, as will be understood.

My gate is of simple construction, composed of comparatively few parts which are not liable to get out of order, and has been found very strong and efficient in use.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

The herein-described gate comprising the uprights and cross-bar, a pivoted stile, a gate-frame connected to said stile, an operating-bar, pivotally connected to one of the uprights, flexible connections extending from the operating-bar to the stile and secured at opposite sides thereon, a latch pivoted to the gate-frame, cords attached to the latch, said cords being connected at their opposite ends to the flexible connections intermediate their ends, a catch on one of the uprights for engaging the latch-bar, and operating-cords depending from the operating-bar, substantially as described.

In testimony whereof I have hereunto set my hand in presence of two subscribing witnesses.

JAMES T. REESE.

Witnesses:
  W. T. CHINEY,
  S. E. MCINTYRE.